May 5, 1925.  
W. M. SAUNDERS  
SPOOL  
Filed March 2, 1925
1,537,034
2 Sheets-Sheet 1
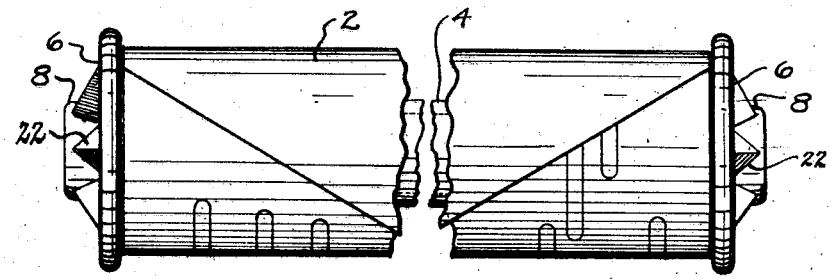
Fig. 1
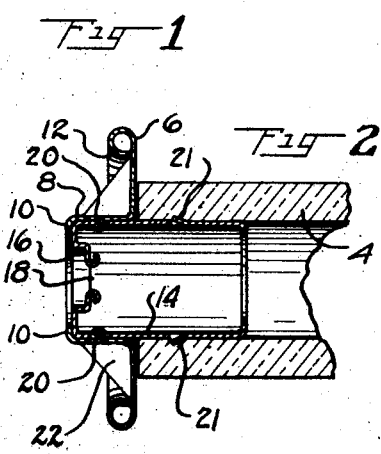
Fig. 2
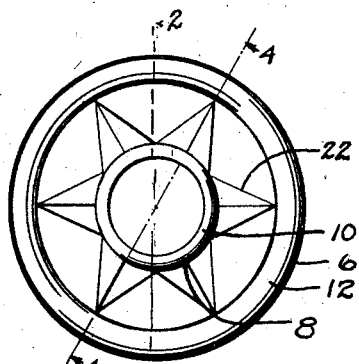
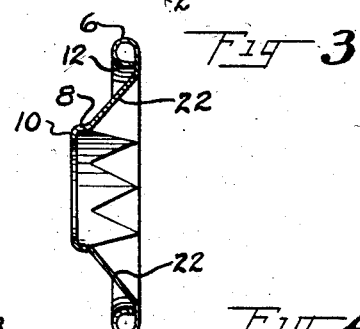
Fig. 3
Fig. 4
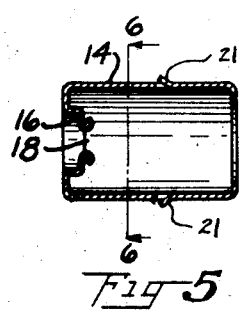
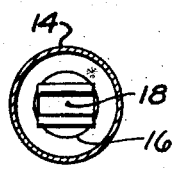
Fig. 5
Fig. 6
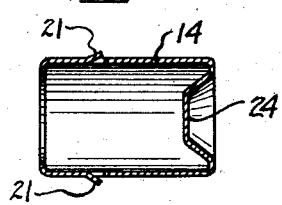
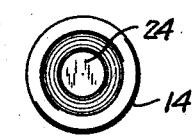
Fig. 7
Fig. 8
W. M. Saunders
INVENTOR
BY Bartlett Arnold
ATTORNEYS

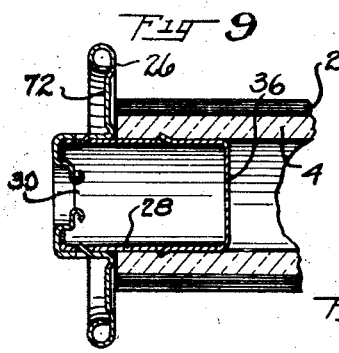
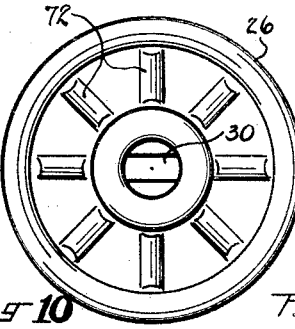
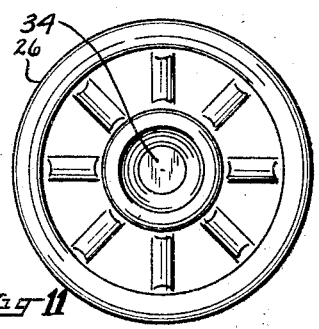
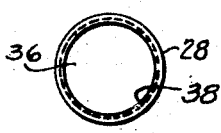
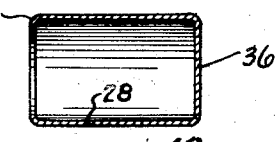
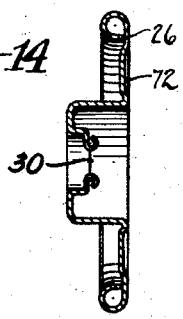
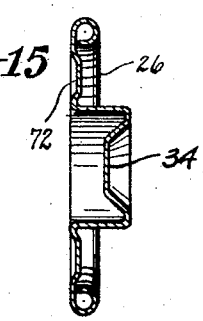
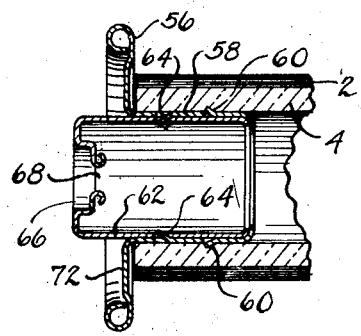
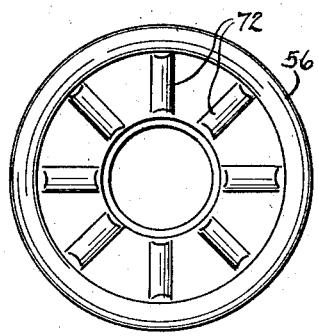
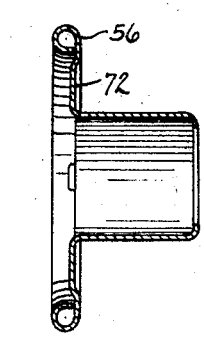
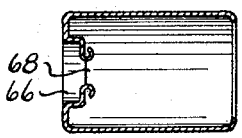
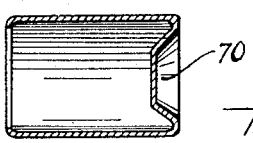

Patented May 5, 1925.

1,537,034

UNITED STATES PATENT OFFICE.

WILLIAM M. SAUNDERS, OF WATERBURY, CONNECTICUT, ASSIGNOR TO THE MATTATUCK MANUFACTURING COMPANY, OF WATERBURY, CONNECTICUT, A CORPORATION OF CONNECTICUT.

SPOOL.

Application filed March 2, 1925. Serial No. 12,619.

*To all whom it may concern:*

Be it known that I, WILLIAM M. SAUNDERS, a citizen of the United States, residing at Waterbury, county of New Haven, State of Connecticut, have invented a certain new and useful Improvement in Spools, of which the following is a full, clear, and exact description.

My invention relates to improvements in spools, particularly spools for rolls of perforated sheets for player pianos and has for its object to provide new and improved roll ends. A further object of my invention is to provide sheet metal ends especially adapted for music rolls which shall be inexpensive to manufacture and of durable construction.

The following is a description of an embodiment of my invention reference being had to the accompanying drawings, in which:

Figure 1 is a side elevation of a music roll embodying my invention;

Fig. 2 is a longitudinal section of a portion of the spool of Fig. 1 on the line 2—2, Fig. 3;

Fig. 3 is an end elevation of a flange member forming part of my improved end;

Fig. 4 is a longitudinal section of the flange member on the line 4—4, Fig. 3;

Fig. 5 is a longitudinal section of an inner telescoping member of my roll end, Fig. 2;

Fig. 6 is a section of the same on the line 6—6, Fig. 5;

Fig. 7 is a longitudinal section of the inner telescoping member of the right end;

Fig. 8 is an end view of Fig. 7;

Fig. 9 shows in section a modified form of roll end;

Fig. 10 is an end elevation of the same;

Fig. 11 is an end elevation of a corresponding right hand roll end;

Fig. 12 is an end view of the inner telescoping member of the roll end of Fig. 9;

Fig. 13 is a longitudinal section of the part shown in Fig. 12;

Fig. 14 is a sectional view of the flange member of Fig. 9;

Fig. 15 is a sectional view of the flange member of the right hand end of the spool corresponding to the left hand end shown in Fig. 9;

Fig. 16 is a longitudinal section showing a second modification;

Fig. 17 is an end view of the flange member of Fig. 16;

Fig. 18 is a longitudinal sectional view of said flanged member;

Fig. 19 is a longitudinal sectional view of the inner member of Fig. 16; and

Fig. 20 is a longitudinal sectional view of the inner member of a right hand roll end corresponding to the roll end of Fig. 16.

Referring more particularly to the drawings, 2 is a sheet of perforated paper for a player-piano rolled upon a cylinder 4 of paste-board, or the like, provided with right and left hand roll ends. Each of these roll ends consists of a flange member 6 formed of sheet metal by suitable dies and having a central tubular portion 8 integral with the flange of said flange member, drawn from the central portion thereof and constituting a socket. This tubular projection has an overhanging edge 10 and a curled edge 12. Fitting tightly within the tubular portion 8 is an inner telescoping shell or tubular member 14, one end of which is slightly sunken as at 16 and provided with a slot 18, Fig. 6, for receiving the flattened end of a driving spindle. The two parts of the roll end are preferably secured together by indenting the outer member, as at 20, so as to form a securing projection. The portion of the inner member within the core 4 is preferably formed with outward projections 21 constituting ordinary barbs which aid in securing the roll end to the core 4 by engaging the interior of the bore of the core 4. The flanges are provided with star-shaped corrugations 22, sloping and merging at their inner ends with the wall of the tubular portion 8, stiffening and bracing the flange.

The right hand end of the spool is the same in construction as the left hand end, except that the inner tubular member is provided with a closed end 24, as shown in Figs. 7 and 8, forming a bearing surface for a fixed spindle. In this form the parts 6 and 8 are first assembled, as shown, and then the protruding end of the portion 8 is forced within the bore of the core making a tight fit therewith so as to be held frictionally therein, the holding action being reenforced by the barbs 22. The overhanging edge 10 produces a double thickness of metal at the outer end of the roll end, thus making a strong construction which will resist hard usage better than a single thickness of sheet metal of the same gauge.

In the form shown in Figs. 9 to 13 the construction is somewhat similar, the difference being that the flange member 26 while it has a socket receiving the inner shell member 28 in a similar manner, has the driving slot 30 formed in the socket portion integral with the flange, instead of being formed in the end of the inner member 28. In a similar manner the flange member of the right hand roll end has the bearing surface 34 formed integral therewith. In this form the inner end of the member 28 may be closed, as shown at 36, the other end having an inturned edge 38 which produces a double thickness of metal at the outer ends of the roll ends with the resulting advantages referred to in connection with the construction of Fig. 2.

In the form shown in Figs. 16 to 20, 56 is the flange of the flanged member having the tubular socket portion 58 drawn from its central portion and provided with external barbs 60. 62 is the inner shell member open at its inner end and closely fitting within the portion 58 so as to make a frictional fit and preferably being in addition secured thereto by projections 64. The outer end of this shell member 62 is provided with a recess 66 in the bottom of which is formed a driving slot 68. The right hand end member corresponding to the member shown in Fig. 16 is similar in construction with the exception that the right hand end of the inner shell member is provided with a recess 70 for forming a bearing for the stationary spindle of the mechanism with which the roll is to be used, the left hand end of the part shown in Fig. 20 telescoping within the tubular projection formed from the center of the flanged member, shown in Fig. 18. Preferably the flanges of the flanged members are strengthened by radially embossed portions 72.

In this modification the roll ends are made up of two telescoping parts, but in this case the telescoping portions are both within the bore of the core. This construction while equally simple and inexpensive, does not have the advantage of the two thicknesses of metal upon the outer end.

The roll ends may be made of sheet steel or any other suitable metal and on account of their durability, accuracy and cheapness, constitute a valuable advance in the art. The tubular portion of the flanged member being integral with the flange insures an accurate shank which eliminates the possibility of the roll running out of true, which is a very essential point. The shank being forced into the core until the flange engages the end of the same causes the flange to provide a true riding edge for the paper to coil on, which is another important point in music roll holders. Because the flange is reenforced by radiating corrugations and the rim of the flange is curled, as shown, the flange can be made from light material and still have the desired strength. The force of any blow upon the end of the spool, caused by any means, such as dropping the spool upon the floor, is transmitted to the flange of the flanged member through metal parallel to the axis of the spool, thus reducing the danger of distortion due to such blows, and in the form shown in Figs. 1 and 9, the double thicknesses of metal at the exterior ends cooperate to resist the action of such blows.

I preferably fasten the metallic parts together by partially punching out and turning in a portion of the metal and in case this is done, spot-welding, riveting or brick-punching to secure the parts may be omitted. I preferably fasten the two members together, however, by some means other than friction so as to guard as far as possible against any relative movement of the two metallic parts.

As will be evident to those skilled in the art, my invention permits of various modifications without departing from the spirit or the scope of the appended claims.

What I claim is:

1. In a music roll having a core with openings in its ends, a flanged sheet metal member having a cylindrical socket portion protruding therefrom and integral therewith, a separately formed rigid cylindrical shell member fitting and inserted within said socket portion and having a portion protruding therefrom, one of said members having a spindle engaging portion, one of said protruding portions entering said core.

2. In a music roll having a core with openings in its ends, a flanged sheet metal member having a cylindrical socket portion protruding therefrom and integral therewith, a separately formed rigid cylindrical shell member fitting and inserted within said socket portion and protruding therefrom, one of said members having a spindle engaging portion, said spindle engaging portion being adjacent to the end of said socket portion and the protruding end of said shell member entering said core the outer ends of said socket and shell having inwardly extending portions engaging one another and providing a double thickness of metal.

3. In a music roll having a core with openings in its ends, a sheet metal flanged member having a socket portion protruding therefrom, a separately formed shell member inserted within said socket portion and protruding therefrom, said shell member having a spindle engaging portion adjacent to the end of said socket portion, and the protruding part of said shell portion entering said core.

4. In a music roll having a core with openings in its ends, a sheet metal flanged member having a cylindrical socket portion protruding therefrom and integral therewith, a separately formed rigid cylindrical shell member fitting and inserted within said socket portion and protruding therefrom, one of said members having a slotted spindle engaging portion adjacent to the end of said socket portion, said shell member having its protruding portion entering said core the outer ends of said socket and shell having inwardly extending portions engaging one another and providing a double thickness of metal.

5. In a music roll having a core with openings in its ends, a sheet metal flanged member having a socket portion protruding therefrom, a separately formed shell member inserted within said socket portion and protruding therefrom, said shell member having a spindle engaging slot adjacent to the end of said socket portion and the protruding end of said shell member entering said core.

6. In a music roll having a core with openings in its ends, a flanged sheet metal member having a cylindrical socket portion protruding therefrom and integral therewith, a separately formed rigid cylindrical shell member fitting and inserted within said socket portion and protruding therefrom, one of said members having a spindle engaging portion, said spindle engaging portion being adjacent to the end of said socket portion and the protruding end of said shell member entering said core, the flange of said flanged member having radial corrugations whose inner ends merge with the walls of said socket.

In testimony whereof, I have signed my name to this specification this 27th day of February, 1925.

WILLIAM M. SAUNDERS.